United States Patent

Miyazaki et al.

[11] Patent Number: 5,169,703
[45] Date of Patent: Dec. 8, 1992

[54] MAGNETIC RECORDING MEDIUM AND METHOD FOR PRODUCTION THEREOF

[75] Inventors: Takahiro Miyazaki; Minoru Yamaga; Tadahiro Abe; Tsutomu Ogawa, all of Miyagi, Japan

[73] Assignee: Sony Corporation, Tokyo, Japan

[21] Appl. No.: 727,057

[22] Filed: Jul. 8, 1991

[30] Foreign Application Priority Data

Jul. 10, 1990 [JP] Japan .................... 2-182285

[51] Int. Cl.$^5$ .............................................. G11B 23/00
[52] U.S. Cl. ...................................... 428/141; 428/143; 428/694; 428/900; 427/128
[58] Field of Search ............... 428/141, 143, 694, 900; 427/128

[56] References Cited

U.S. PATENT DOCUMENTS

| | | | |
|---|---|---|---|
| 4,713,278 | 12/1987 | Yoda et al. | 428/141 |
| 4,746,558 | 5/1988 | Shimozawa et al. | 428/141 |
| 4,946,729 | 8/1990 | Nishimatsu et al. | 428/141 |
| 4,997,696 | 3/1991 | Kamada et al. | 428/141 |

Primary Examiner—Paul J. Thibodeau
Assistant Examiner—Leszek Kiliman
Attorney, Agent, or Firm—Hill, Van Santen, Steadman & Simpson

[57] ABSTRACT

A magnetic recording medium having minute irregularities on the surface of a magnetic layer is disclosed. The value of the ratio $A_V/A_P$, where $A_V$ and $A_P$ are cross-sectional areas of valleys and projections as measured in a plane lower by 50 nm and in a plane higher than 50 nm than an intermediate plane of the magnetic layer, respectively, with the measurement being made using a three-dimensional roughness meter, is given by $A_V/A_P \geq 0.90$, wherein the intermediate plane is a plane for which the cross-sectional area of the projections is approximately equal to that of the valleys. The minute irregularities on the surface of the magnetic layer are produced by providing a non-magnetic substrate presenting different surface roughnesses on its front surface and back surface, and by transferring surface irregularities constituting the surface roughness of the back surface of the non-magnetic substrate to the front surface of the substrate.

5 Claims, 1 Drawing Sheet

MAGNETIC RECORDING MEDIUM AND METHOD FOR PRODUCTION THEREOF

BACKGROUND OF THE INVENTION

This invention relates to a magnetic recording medium, such as a video tape.

For improving electro-magnetic transducing properties of a magnetic tape, it is more beneficial to smooth the surface of a base film to as close to a mirror surface as possible and to smooth the surface of a magnetic layer to reduce surface irregularities.

Hence, as a nonmagnetic substrate for a magnetic recording medium, for which high electro-magnetic transducing properties are required, it is necessary to employ a base film having good surface characteristics, that is, low surface roughness.

The reason is that the surface characteristics of the base film, as a substratum of the magnetic layer, are reflected on those of the magnetic layer formed thereon.

However, as the surface of the magnetic layer becomes smoother, the magnetic tape is affected in its running properties, such that difficulties are raised in achieving smooth running of the magnetic tape.

For this reason, in a conventional magnetic recording medium, it is a frequent practice to employ a base film having good surface characteristics and to add non-magnetic pigments, such as carbon particles, to the magnetic layer to produce surface irregularities to procure the running properties of the magnetic tape at the cost to some extent of its electro-magnetic transducing properties.

In short, it has been difficult with the prior art technology to meet the requirements for high electro-magnetic transducing properties and tape running properties simultaneously, so that one has to make much of one of the properties at the cost of the other.

SUMMARY OF THE INVENTION

It is an object of the present invention to provide a magnetic recording medium whereby both the electro-magnetic transducing properties and tape running properties can be procured at higher levels.

The present inventors have conducted eager searches towards accomplishing the above object, and have found that, by optimizing the state of roughness, above all, the ratio of valleys to projections, of the surface of a magnetic layer of a magnetic tape, it becomes possible to assure satisfactory running properties of the magnetic tape without lowering its electromagnetic transducing properties.

According to the present invention, there is provided a magnetic recording medium comprising a magnetic layer on a non-magnetic substrate, said magnetic layer presenting minute irregularities, wherein, a non-contact measurement being made of the surface of said magnetic layer with the aid of a three-dimensional surface meter, a ratio $A_V/A_P$ is given by $$A_V/A_P \geq 0.90$$

wherein $A_P$ and $A_V$ represent the cross-sectional areas of projections and valleys, respectively, of said minute surface irregularities as measured in planes higher and lower by 50 nm, respectively, than an intermediate plane which runs parallel to a film surface of said magnetic layer and for which the cross-sectional area of said projections is approximately equal to that of said valleys.

Thus the present invention provides a magnetic recording medium in which, by optimizing the ratio of valleys to projections in the minute surface irregularities of the surface of the magnetic layer, satisfactory running properties and high-level electro-magnetic transducing properties can be achieved with satisfactory compatibility.

With the magnetic recording medium, the ratio of valleys to projections in the minute surface irregularities of the surface of the magnetic layer affect the electro-magnetic transducing properties and tape running properties seriously, so that, if the minute surface irregularities are afforded as a result of addition of non-magnetic pigments, as in the case of the conventional magnetic recording medium, so that the proportion of the projections becomes higher, the electro-magnetic transducing properties or the tape running properties are unavoidably lowered, even if the surface roughness of the magnetic recording medium is controlled appropriately.

With the magnetic recording medium of the present invention, the ratio $A_V/A_P$, as an index of the ratio between the valleys and the projections, is set so as to be not less than 0.90, and hence the proportion of the valleys is increased as compared to the case of the conventional magnetic recording medium, so that the requirements for high-level electro-magnetic transducing properties and tape running properties can be satisfied with a high degree of compatibility.

DETAILED DESCRIPTION OF THE INVENTION

Figure 1:
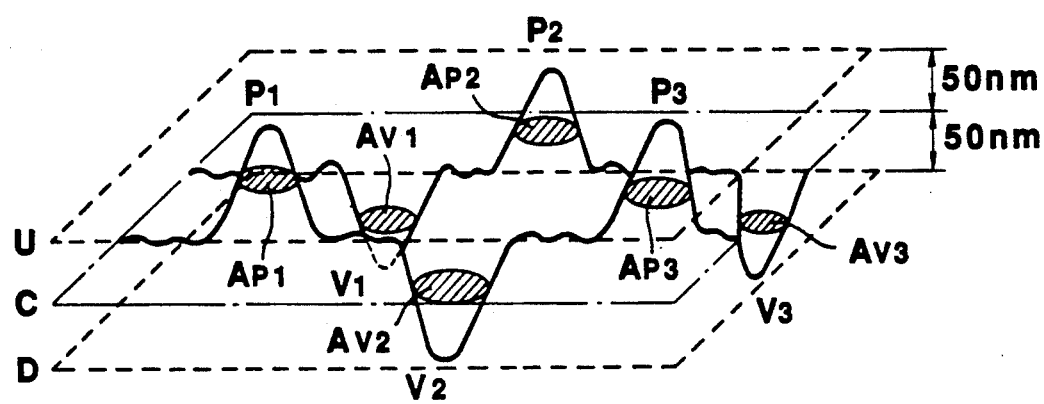
FIG. 1 is a schematic view showing the state of the minute valleys and projection on the surface of a magnetic layer.

In the magnetic recording medium of the present invention, the state of the minute irregularities, above all, the valley to projection ratio, of the surface of the magnetic layer, is crucial.

According to the present invention, the cross-sectional area of the projections and that of the valleys of a given flat surface, as an index of the valley to projection ratio, are measured in a non-contact manner with the aid of a three-dimensional roughness meter, and an optimum range of the valley to projection ratio is determined based on the measured result of the ratio of the cross-sectional areas.

Referring to FIG. 1, schematically showing the ratio of fine valleys and projections on the surface of the magnetic layer, minute irregularities usually exist on the surface of the magnetic layer.

These irregularities present the form of projections P or valleys V. That is, if an intermediate plane or central plane C is set, those areas higher in level than the plan C represent the projections P, whereas those areas lower in level than the plane C represent the valleys V.

The central plane C is defined as a flat plane which runs parallel to the film surface of the magnetic layer and in which the cross-sectional area of the projections is approximately equal to that of the valleys.

If the central plane C is set in this manner, the ratio between the projections P and the valleys V may be approximately defined as a ratio of cross-sectional areas in a plane removed from the central plane C by a certain distance in the direction of the projections and in a plane removed from the plane C by the same distance in the direction of the valleys.

For example, if a plane parallel to the central plane C and removed 50 nm therefrom in the direction of the projections, that is a plane higher in level by 50 nm from the plane C, is termed U, a plane parallel to the central plane C and removed 50 nm therefrom in the direction of the valleys, that is a plane lower in level by 50 nm from the plane C, is termed D, the sum of the cross-sectional areas of cross-sections $A_{P1}$, $A_{P2}$, $A_{P3}$, ... of projections $P_1$, $P_2$, $P_3$ ... in the plane U per unit area is termed $A_P$ and the sum of the cross-sectional of cross-sections $A_{V1}$, $A_{V2}$, $A_{V3}$, ... in the plane D per unit area is termed $A_V$, the ratio of the valleys V to the projections P to given by $A_V/A_P$.

With the conventional magnetic recording medium, since the minute irregularities on the surface of the magnetic layer are formed by non-magnetic pigments etc., the proportion of the projections is necessarily increased so that the value of the ratio $A_V/A_P$ is lower than 0.75.

Conversely, with the recording medium of the present invention, the value of the ratio $A_V/A_P$ is set to 0.90 or more. If the ratio $A_V/A_P$ is lower than 0.90, it becomes difficult to achieve compatibility between electro-magnetic transducing properties and tape running properties.

In order for the ratio $A_V/A_P$ to be 0.90 or more, it suffices to employ a base film having different surface properties on its front surface and back surface and to transfer surface irregularities one surface of the base film to a magnetic layer formed on its other surface.

For example, a base film having a center line average height Ra of one surface (surface A) of 3 to 9 nm and a center line average height Ra of the other surface (surface B) of 12 to 24 nm is used, and a magnetic paint is coated on the surface A and dried in situ to form a magnetic layer. The base film is then taken up on a roll before the magnetic layer is cured completely. In this manner, surface irregularities on the surface B are transferred onto the surface of the magnetic layer. The film is then processed by calendaring, curing etc. so that the enter line average height Ra of the surface of the magnetic layer is equal to 4 to 8 nm. A backcoating layer is finally applied to the surface B to complete a magnetic recording medium.

As the aforementioned base film having different surface properties on its front and rear surface, a biaxially stretched film, in which an ultrathin layer 0.01 to 0.5 μm thick is formed by co-extrusion on one surface of a base film is most preferred. Such biaxially stretched film is occasionally referred to hereinafter as a co-extruded film. During this co-extrusion process, different resin materials are stored in a heat-melted and plasticized state in dies and are caused to travel between a pair of chill rolls so as to be biaxially stretched under normal operating conditions and thereby unified to form a base film. It is noted that, in the above mentioned co-extruded film, surface properties on the base film side and on the ultrathin layer side may be controlled by mixing fine particles of a non-magnetic material into the ultrathin layer. As the non-magnetic fine particles, those dispersible alone and having a narrow particle size distribution, such as spherical silica or fine particles of benzoguanamine resin, styrene resin or acrylic resin, are most preferred. Although desired surface properties may be achieved by adjusting the mean particle size and/or the amount of the non-magnetic fine particles, it is preferred that, for realizing the value of the $A_V/A_P$ ratio not less than 0.90 as well as excellent electro-magnetic transducing properties and tape running properties, the mean particle size of the non-magnetic fine particles be in a range of 0.02 to 1.00 μm, and that the density of the non-magnetic fine particles in the ultrathin layer be in a range of $1 \times 10^4$ to $1000 \times 10^4/mm^2$.

On the other hand, there is no limitation to the types or the amounts of a binder, magnetic powders or various additives contained in the magnetic paint for forming the magnetic layer, and any of the agents commonly employed in ordinary coating type magnetic recording medium may be employed in the magnetic paint.

Similarly, any of the compositions, film thickness etc. of the backcoating paint commonly employed in the coating type magnetic recording medium may be employed for forming the backcoating layer.

The present invention will be explained with reference to results of test data.

EXAMPLES 1 TO 8

In the present Examples, a co-extruded film having different surface properties on its front and back surfaces was used as a base film, and the surface properties on its back surface were transferred to a magnetic layer formed on its front surface to produce test magnetic tapes exhibiting the different surface properties.

In the following, the compositions of a magnetic paint used in the examples are given, in which the parts are indicated as those by weight.

| Composition A | parts |
| --- | --- |
| magnetic material particles (specific surface area, 55 m²/g) | 100 |
| polyurethane resin | 12 |
| vinyl chloride copolymer | 12 |
| alumina | 8 |
| butyl stearate | 1 |
| stearic acid | 1 |
| methylethylketone | 100 |
| toluene | 60 |
| cyclohexanone | 60 |

The above composition was dispersed by a sand mill, added to by 5 parts by weight of a curing agent sold under the trade name of Coronate L, applied to a base film so that a film thickness on drying is 3.6 μm, and dried to produce a composite film. The composite film was then taken up on a roll whilst the magnetic layer was not cured completely. During this take-up process, surface irregularities on the back surface of the base film were transferred to the surface of the magnetic layer.

The composite film was then calendered and heated at 60° C. for 12 hours, after which a backcoating layer was applied on the irregular surface. The so-produced three-layer composite film was cut to strips each 8 mm wide to produce sample magnetic tapes.

The surface properties of the magnetic layer were adjusted to predetermined values by adjusting the sand-milling time duration and/or calendaring conditions.

COMPARATIVE EXAMPLE 1

In the present Comparative example, a base film having the same surface properties for front and back surfaces was used, and surface irregularities on the surface of the magnetic layer were produced by mixing carbon particles into the magnetic layer.

In the following, the composition of a magnetic paint used for the present Comparative Example is given, in which parts are again indicated as those by weight.

| Composition B | parts |
|---|---|
| magnetic material powders (specific surface area, 55 m$^2$/g) | 100 |
| polyurethane resin | 12 |
| vinyl chloride copolymer | 12 |
| carbon particles (mean particle size, 0.3 μm) | 2 |
| alumina | 8 |
| butyl stearate | 1 |
| stearic acid | 1 |
| methylethylketone | 100 |
| toluene | 60 |
| cyclohexanone | 60 |

The above composition was dispersed by a sand mill and added to by 5 parts by weight of a curing agent, sold under the trade name of Coronate L. The resulting mass was coated on a base film to a film thickness on drying of 3.6 μm and dried to produce a composite film.

A backcoating layer was coated on the dried composite film, and the resulting three-layered film was then dried and taken up on a drum.

After the film was calendered and heated at 60° C. for 12 hours, the film was cut to a width of 8 mm to produce a sample magnetic tape.

The surface properties of the magnetic layer were adjusted to a predetermined value by adjusting the sand-milling time duration and/or calendaring conditions.

COMPARATIVE EXAMPLES 2 TO 5

In the present Comparative Examples, base films having different surface properties were employed, and surface properties of the magnetic layers were controlled by the surface properties of the base films, sand milling time duration and/or calendaring conditions.

The magnetic paint, employed in the Comparative Examples, was of the composition A, as in the preceding Examples 1 to 8. Using the magnetic paint, sample magnetic tapes were produced by using the same technique as that used in Comparative Example 1.

Of the sample magnetic tapes, produced by the Examples and the Comparative Examples, tape running properties (frictional coefficients), electro-magnetic transducing properties (Y-C/N) and dropout were measured.

It is noted that the frictional coefficient was measured by using a stainless steel guide pin under the conditions of the temperature of 40° C., relative humidity of 80 percent, load of 20 g and a velocity of 5 mm/second. For measuring Y-C/N, signals of 7 Mhz were recorded and the ratio of the 7 MHz output to the 6 MHz output was measured. For measuring the dropout, the signal of 7 MHz was recorded and reproduced, dropouts for longer $-16$ dB/μsec or were counted, and the occurrences of 20 or lesser dropouts, 20 to 40 dropouts and more than 40 dropouts per minute were marked as O, Δ and x, respectively. The results are shown in the following table.

The center line average heights Ra of the surface A (the base film surface on which the magnetic layer is formed) and the surface B (the base film surface opposite to the surface A), the center line average height Ra of the surface of the magnetic layer, the composition of the magnetic paint and the values of the ratio $A_V/A_P$, are also shown in the Table. Meanwhile, the values of the ratio $A_V/A_P$ were measured by non-contact measurement using a three-dimensional roughness meter, manufactured and sold by Kosaka Laboratories under the trade name of EJ-30HK.

TABLE

| | Base film | | magnetic | magnetic | | | | |
|---|---|---|---|---|---|---|---|---|
| | surface A Ra (nm) | surface B Ra (nm) | layer Ra (nm) | paint composition | $A_V/A_P$ | frictional coefficient | Y − C/N | dropouts |
| Ex. 1 | 4.6 | 14.6 | 5.4 | A | 0.93 | 0.28 | +2.2 | ○ |
| Ex. 2 | 4.4 | 18.6 | 5.5 | A | 1.33 | 0.25 | +1.9 | ○ |
| Ex. 3 | 4.6 | 22.4 | 5.7 | A | 1.55 | 0.19 | +1.6 | ○ |
| Ex. 4 | 5.9 | 18.3 | 5.4 | A | 1.15 | 0.26 | +1.8 | ○ |
| Ex. 5 | 4.8 | 20.3 | 4.9 | A | 1.26 | 0.25 | +2.1 | ○ |
| Ex. 6 | 4.8 | 20.3 | 5.6 | A | 1.20 | 0.24 | +1.7 | ○ |
| Ex. 7 | 4.8 | 20.3 | 6.1 | A | 1.10 | 0.24 | +1.5 | ○ |
| Ex. 8 | 4.8 | 20.3 | 6.9 | A | 0.91 | 0.20 | +1.4 | ○ |
| Comp. Ex. 1 | 6.1 | 6.1 | 7.2 | B | 0.44 | 0.27 | 0 | ○ |
| Comp. Ex. 2 | 6.1 | 6.1 | 4.9 | A | 0.70 | 0.62 | +2.8 | ○ |
| Comp. Ex. 3 | 18.9 | 19.1 | 5.2 | A | 0.73 | 0.29 | +1.8 | x |
| Comp. Ex. 4 | 4.6 | 29.7 | 6.5 | A | 0.61 | 0.17 | +0.4 | ○ |
| Comp. Ex. 5 | 20.3 | 4.8 | 5.6 | A | 0.55 | 0.68 | +2.8 | Δ |

It is seen from the above table that, with the sample magnetic tapes with the value of the ratio $A_V/A_P$ not less than 0.90, the tape running properties and electromagnetic transducing characteristics are both satisfactory, while the occurrence of the dropouts are also reduced.

On the contrary, with the Comparative Example 1, for which the surface properties of the magnetic layer are controlled by addition of carbon particles, the electro-magnetic transducing properties are lowered, even though satisfactory tape running properties are achieved. With the other Comparative Examples, since the value of the ratio $A_V/A_P$ is less than 0.90, one or more of the running properties, electro-magnetic transducing properties or signal dropout is lowered.

What is claimed is:

1. In a magnetic recording medium comprising a magnetic layer on a non-magnetic substrate, said magnetic layer being composed of a magnetic powder dispersed in a binder, said magnetic layer presenting minute irregularities, wherein the improvement resides in that, said non-magnetic substrate having different surface roughness for a first surface on which said magnetic layer is formed and a second surface opposite thereto, and surface irregularities on said second surface being transferred to the surface of said magnetic layer, a non-contact measurement being made of the surface of said magnetic layer with the aid of a three-dimensional surface meter, the ratio Av/Ap is given by Av/Ap≧0.90 wherein Ap and Av represent the cross sectional areas of projections and valleys, respectively, of said minute surface irregularities as measured in planes higher and lower by 50 nm, respectively, than an intermediate plane which runs parallel to a film surface of said magnetic layer and for which the cross sectional area of said projections is approximately equal to that of said valleys.

2. In a magnetic recording medium according to claim 1, wherein a center line average height of said first surface Ra is in a range of 3 nm to 9 nm and a center line average height of said second surface is in a range of 12 nm to 24 nm.

3. In a magnetic recording medium according to claim 2, wherein said non-magnetic substrate is a biaxially stretched film in which an ultra-thin layer with a thickness in a range of 0.01 μm and 0.5 μm is formed on one surface of a base layer by a coextrusion.

4. In a magnetic recording medium according to claim 3, wherein said ultra-thin layer comprises non-magnetic fine particles with a mean particle size in a range of 0.02 μm to 1.0 μm at a particle density in a range of $1 \times 10^4$ to $1000 \times 10^4/mm^2$.

5. A method for producing a magnetic recording medium comprising providing a non-magnetic substrate in which the surface roughness of one surface thereof adapted for forming a magnetic layer thereon is different from the surface roughness of the opposite surface presenting surface irregularities, applying a magnetic layer on said one surface, taking up said substrate on a take-up drum, while said magnetic layer is not completely cured, for transferring said surface irregularities of said opposite surface to a surface of said magnetic layer, and calendaring and curing the resulting mass so that a non-contact measurement being made of the surface of said magnetic layer with the aid of a three-dimensional surface meter, a ratio Av/Ap is given by Av/Ap≧0.90, wherein Ap and Av represent the cross sectional areas of projections and valleys, respectively, of said minute surface irregularities as measured in planes higher and lower by 50 nm, respectively, than an intermediate plane which runs parallel to a film surface of said magnetic layer and for which a cross sectional area of said projections is approximately equal to a cross sectional area of said valleys.

* * * * *